United States Patent [19]
Cockram

[11] Patent Number: 4,792,274
[45] Date of Patent: Dec. 20, 1988

[54] UTILITY TRAILER INCLUDING AUTOMATIC TAILGATE ASSEMBLY

[76] Inventor: Robert E. Cockram, 718 Gilman St., Box 275, Sheffield, Iowa 50475

[21] Appl. No.: 44,295

[22] Filed: Apr. 30, 1987

[51] Int. Cl.⁴ .............................................. B65G 67/02
[52] U.S. Cl. .................................... 414/537; 14/71.1; 296/51
[58] Field of Search ............... 414/537, 538, 477, 480, 414/482–485, 571; 296/51, 61; 14/71.1, 71.3, 72.5

[56] References Cited

U.S. PATENT DOCUMENTS

| | | | |
|---|---|---|---|
| 2,131,337 | 9/1938 | Swertfeger | 414/537 X |
| 2,271,071 | 1/1942 | Haber | 414/537 X |
| 2,750,226 | 6/1956 | Ash | 296/61 |
| 3,972,428 | 8/1976 | Love, Jr. et al. | 414/537 |
| 4,222,698 | 9/1980 | Boelter | 414/477 |
| 4,372,727 | 2/1983 | Fredrickson et al. | 414/537 |
| 4,607,996 | 8/1986 | Koch | 414/537 |

FOREIGN PATENT DOCUMENTS

| | | | |
|---|---|---|---|
| 3512940 | 10/1986 | Fed. Rep. of Germany | 414/537 |
| 183345 | 7/1922 | United Kingdom | 414/480 |
| 723723 | 2/1955 | United Kingdom | 14/71.1 |
| 1450337 | 9/1976 | United Kingdom | 414/537 |

Primary Examiner—Robert J. Spar
Assistant Examiner—David A. Bucci
Attorney, Agent, or Firm—Sixbey, Friedman, Leedom & Ferguson

[57] ABSTRACT

A utility trailer having an automatic loading and unloading ramp and tailgate assembly and a front trigger plate assembly operationally interconnected by an actuating linkage or other drive unit so that when loading the trailer with the item to be transported, the item contacting the front trigger plate assembly causes the movement of the rear automatic ramp assembly into a tailgate forming position. A lock or latching mechanism is provided to automatically retain the rear ramp assembly in the tailgate forming position.

21 Claims, 4 Drawing Sheets

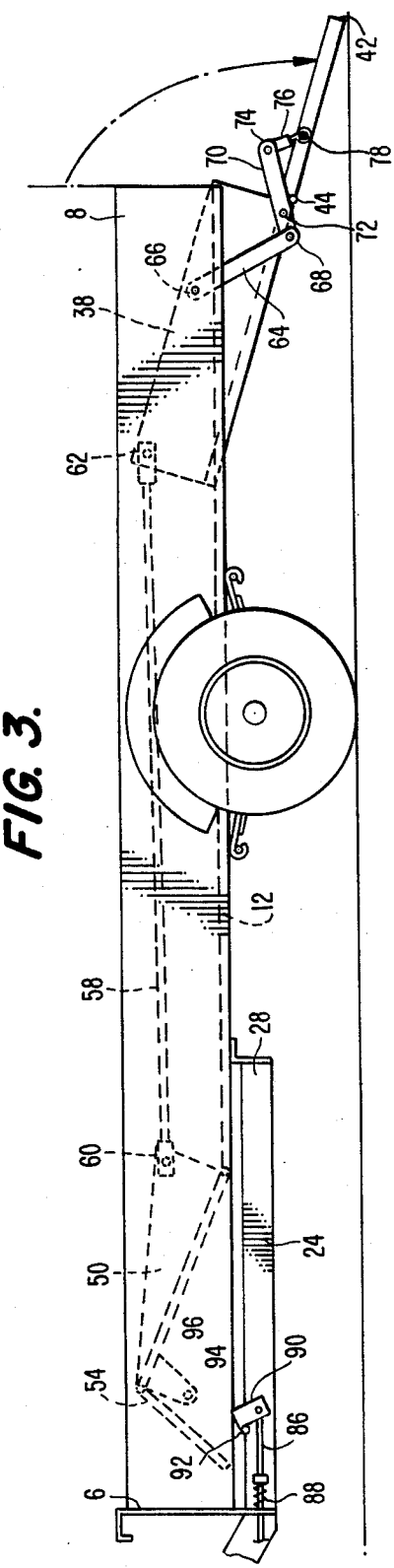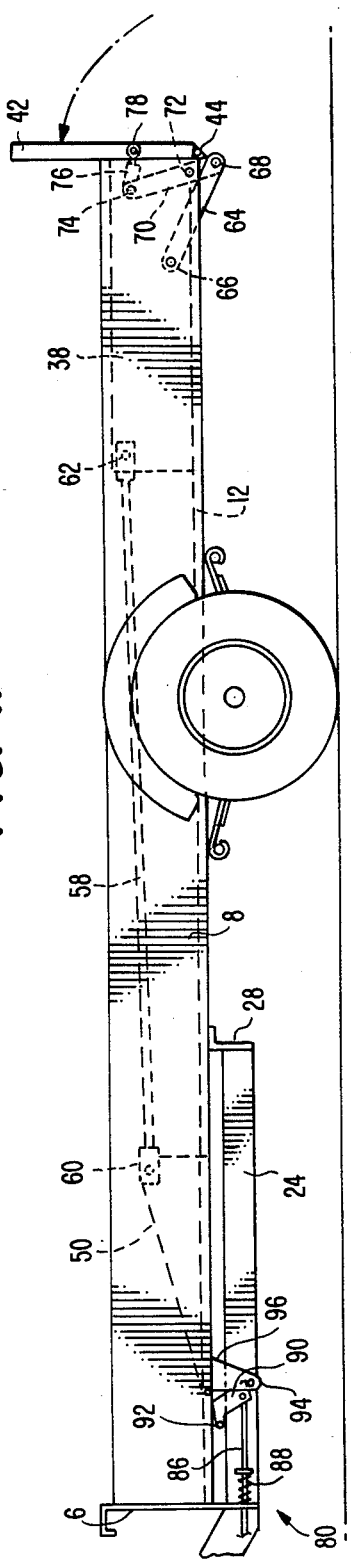

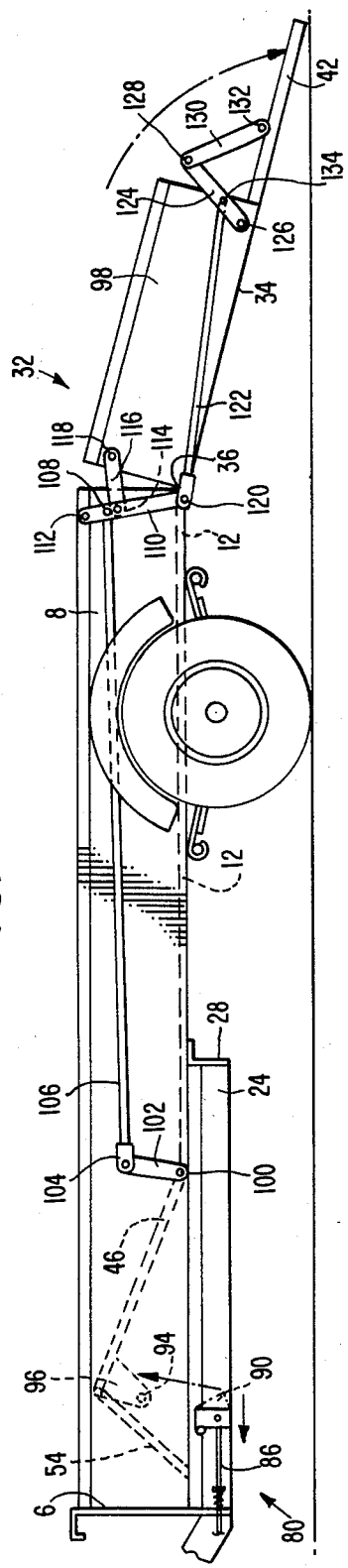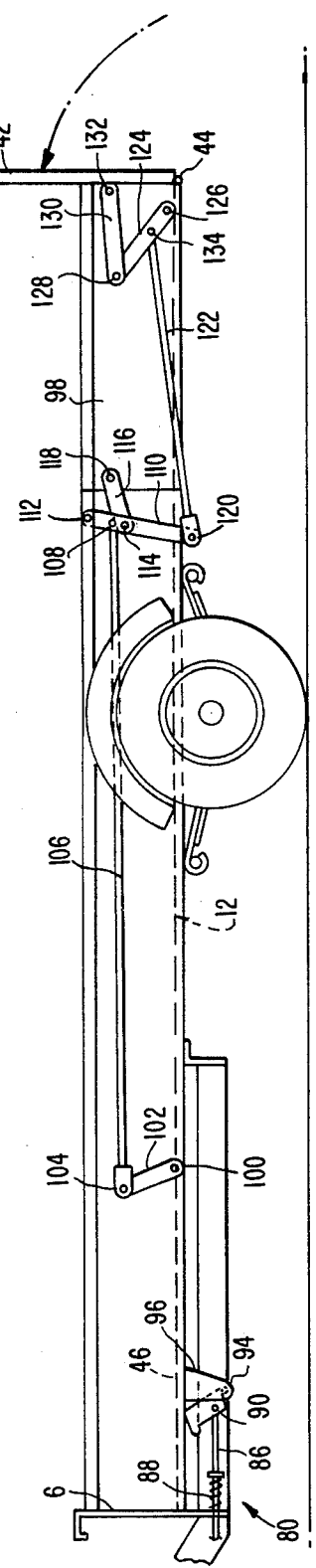

UTILITY TRAILER INCLUDING AUTOMATIC TAILGATE ASSEMBLY

TECHNICAL FIELD

The present invention generally relates to utility trailers of the type that have been provided for towing behind another vehicle. More particularly, the present invention relates to a utility trailer which includes a rear ramp and tailgate assembly which folds up and locks in place automatically as the item to be carried by the trailer is loaded thereon.

BACKGROUND OF THE INVENTION

It is well known to provide various types of utility trailers to be attached to other vehicles for moving materials and items from location to location easily. During the use of such trailers, a persistent problem has been and is to provide for the simple, safe and efficient loading and unloading of the item to be carried on the trailer. Various solutions and/or features which may be integral or used in conjunction with utility trailers have been proposed.

One of the most well represented of such solutions is exemplified by U.S. Pat. No. 3,972,428 (to Love, Jr., et al.) which discloses a trailer which includes a loading ramp construction pivotally mounted on the trailer and movable between a loading position in which the ramp extends rearwardly from the trailer and a tailgate forming position into which the ramp may be locked. While the disclosed loading ramp construction represents an advance over prior art trailers which are not equipped with such pivotally attached ramp devices, it remains necessary for the vehicle operator or an assistant to physically move the ramp into its tailgate position and ensure that it is locked into that position.

Another type of solution proposed to enable the efficient, safe and convenient loading of utility trailers is shown in U.S. Pat. No. 4,372,727 (to Fredrickson, et al.) wherein a multiple fold powered ramp for a trailer is described. The ramp comprises multiple stages which are pivotally connected and may be folded upon themselves for storage and unfolded so that they form an extension of the main ramp portion for loading and unloading. However, the disclosed ramp requires a complicated arrangement of hydraulic conduits and pumps for manipulating the various stages Also well represented in the art, another type of solution proposed to facilitate the loading and unloading of utility tractors is shown in U.S. Pat. No. 4,222,698 (to Boelter) which discloses a trailer assembly that includes a movable frame and a mechanism for adjusting the frame and support portions between a first position and a second position. In effect, the support portions, or bed of the trailer, may be inclined downwardly or tilted by means of the adjusting mechanism to facilitate the loading and unloading of the trailer.

Similarly, U.S. Pat. No. 2,271,071 (to Haber) discloses a trailer type carrier for farm equipment wherein the bed of the trailer may be tilted at an angle to facilitate loading and unloading. This trailer also includes a tailgate which may be pivoted down to the ground to load or unload equipment, and then pivoted to an upright position to maintain the equipment on the trailer.

While these trailers and the associated devices for providing ramps for loading and unloading the trailers represent advances which permit the convenient, safe and efficient loading and unloading of such trailers, there is an efficiency which remains unaddressed. That is, it is necessary for an operator to undertake time consuming, strenuous, and often hazardous steps to manipulate the various ramp devices and trailers into condition for transport movement following the loading of the trailer. Also, should an operator neglect to raise one of these ramp devices before towing of the trailer is initiated, the equipment on the trailer may be discharged and damaged. Also, damage to the trailing ramp is likely to occur.

DISCLOSURE OF THE INVENTION

It is a primary object of the present invention to provide a novel, safe, efficient and inexpensive utility trailer which includes an automatic ramp and tailgate assembly for loading and unloading the trailer.

Another object of the present invention is to provide a utility trailer which includes a ramp and tailgate assembly which folds up automatically in response to the loading of the trailer.

Yet another object of the present invention is to provide a trailer which includes an automatic ramp and tailgate asesmbly which folds down automatically when unlocked so that the trailer may be unloaded.

A further object of the present invention is to provide a utility trailer having a ramp and tailgate assembly which folds up automatically as the item to be carried by the trailer is placed thereon, and which includes a mechanism whereby the tailgate is locked into a tailgate position following the loading of the trailer.

An additional object of the present invention is to provide a novel utility trailer having a rear ramp and tailgate assembly which automatically folds up as the item to be carried by the trailer is loaded into place. The rear ramp and tailgate assembly are connected to a front actuating ramp assembly by a mechanical linkage system, so that as the item to be loaded on the trailer contacts the front ramp assembly, the linkage operatively causes the rear ramp and tailgate assembly to fold upwardly into a tailgate forming position and lock into that position without necessitating the vehicle operator or person supervising the loading of the trailer to participate in the placement and locking of the rear ramp and tailgate assembly.

These and other achievements of the present invention are achieved by providing a utility trailer that has a chassis and frame assembly including a tongue and hitch for attaching the trailer to a tow vehicle, and wheels and suspension means for supporting and moving the trailer over the ground. The trailer includes an automatic loading and unloading ramp assembly which includes a rear ramp and tailgate assembly, a front ramp actuating assembly and an actuating linkage connected to the front and rear ramp assemblies so that, as the unit or item to be carried by the trailer is placed or maneuvered thereon, the item contacts the front ramp actuating assembly which, through the actuating linkage, causes the rear ramp and tailgate assembly to automatically move from a ramp forming position into a tailgate forming position.

DESCRIPTION OF DRAWINGS

FIG. 3 is a side view of the utility trailer of FIG. 1 with the ramp assemblies in a position for loading and with broken lines showing the ramp assemblies including the rear ramp and tailgate assembly, the front ramp actuating assembly and the actuating linkage;

FIG. 4 is a side view of the utility trailer of FIG. 1 showing the ramp assemblies in the position for towing after loading the trailer;

FIG. 6 is a view in side elevation of a second embodiment of the utility trailer of the present invention; and FIG. 7 is a view in side elevation of the utility trailer of FIG. 6 with the ramps in the tow position.

BEST MODE FOR CARRYING OUT THE INVENTION

Figure 1:
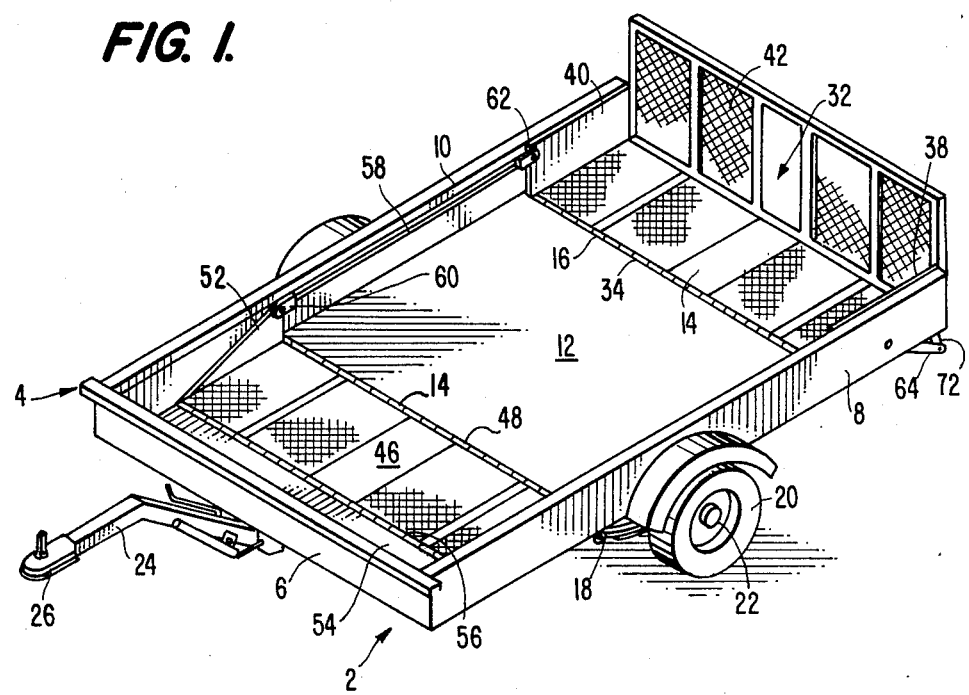
FIG. 1 is a perspective view of the utility trailer of the present invention with the ramp assemblies in position for towing.

Referring now to FIGS. 1-5, the utility trailer of the present invention indicated generally at 2 includes a trailer body 4 having an upstanding front wall 6 connected at either end to parallel-spaced sidewalls 8 and 10. Extending between the sidewalls is a load bearing trailer bed 12 which is secured to the lower extremities of the sidewalls and which has parallel front and rear edges 14 and 16, respectively. The front edge 14 of the trailer bed 12 extends in spaced relationship to the front wall 6 of the trailer body while the rear edge 16 is spaced inwardly from the free ends of the trailer sidewalls 8 and 10.

The trailer body is supported upon a suitable spring-type chassis 18 which secures an axle 20 for two spaced wheels 22 to the bottom of the body 4 beneath the trailer bed 12. The trailer may be attached to a towing vehicle by a towbar 24 having a suitable trailer hitch 26 formed at the free end thereof. The end of the towbar 24 which is opposite to the hitch 26 is secured to the underside of the body 4 as indicated at 28 in FIGS. 3 and 4. To provide strength for the trailer bed 12 for both load support purposes and also to support the chassis 18 and the towbar 24, a support structure 30 is provided formed of bars which are welded between the sidewalls 8 and 10. These bars preferably constitute structural steel support bars which are welded into a grid form to support the trailer bed 12 which may be formed from steel plates.

Figure 2:
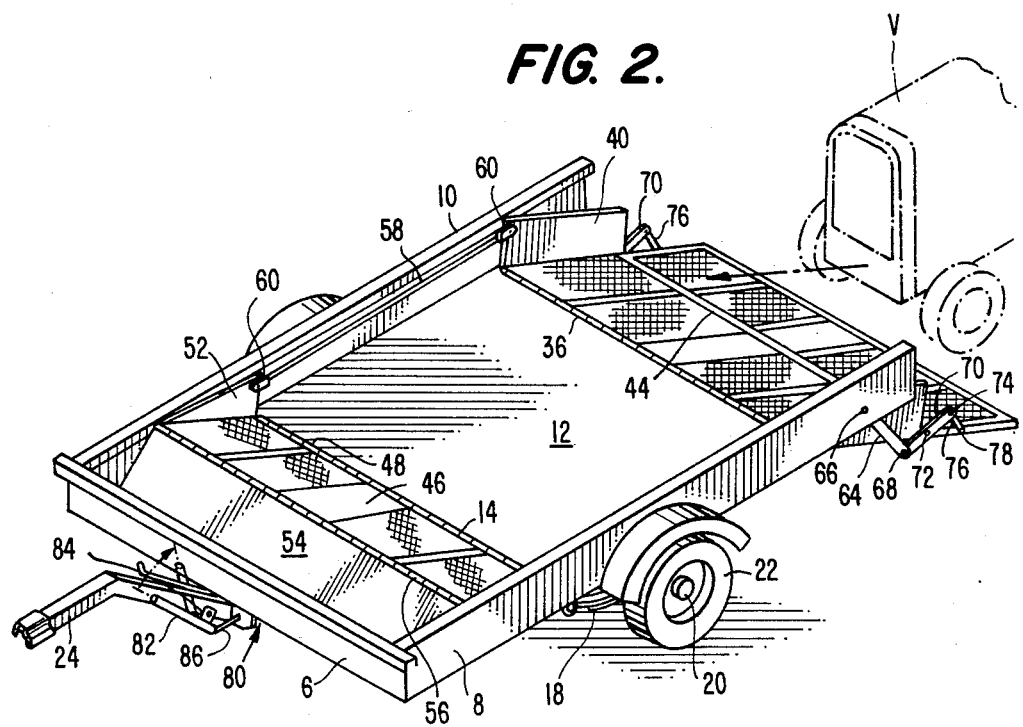
FIG. 2 is a perspective view of the utility trailer of FIG. 1 with the ramp assemblies in position for loading.
Figure 5:
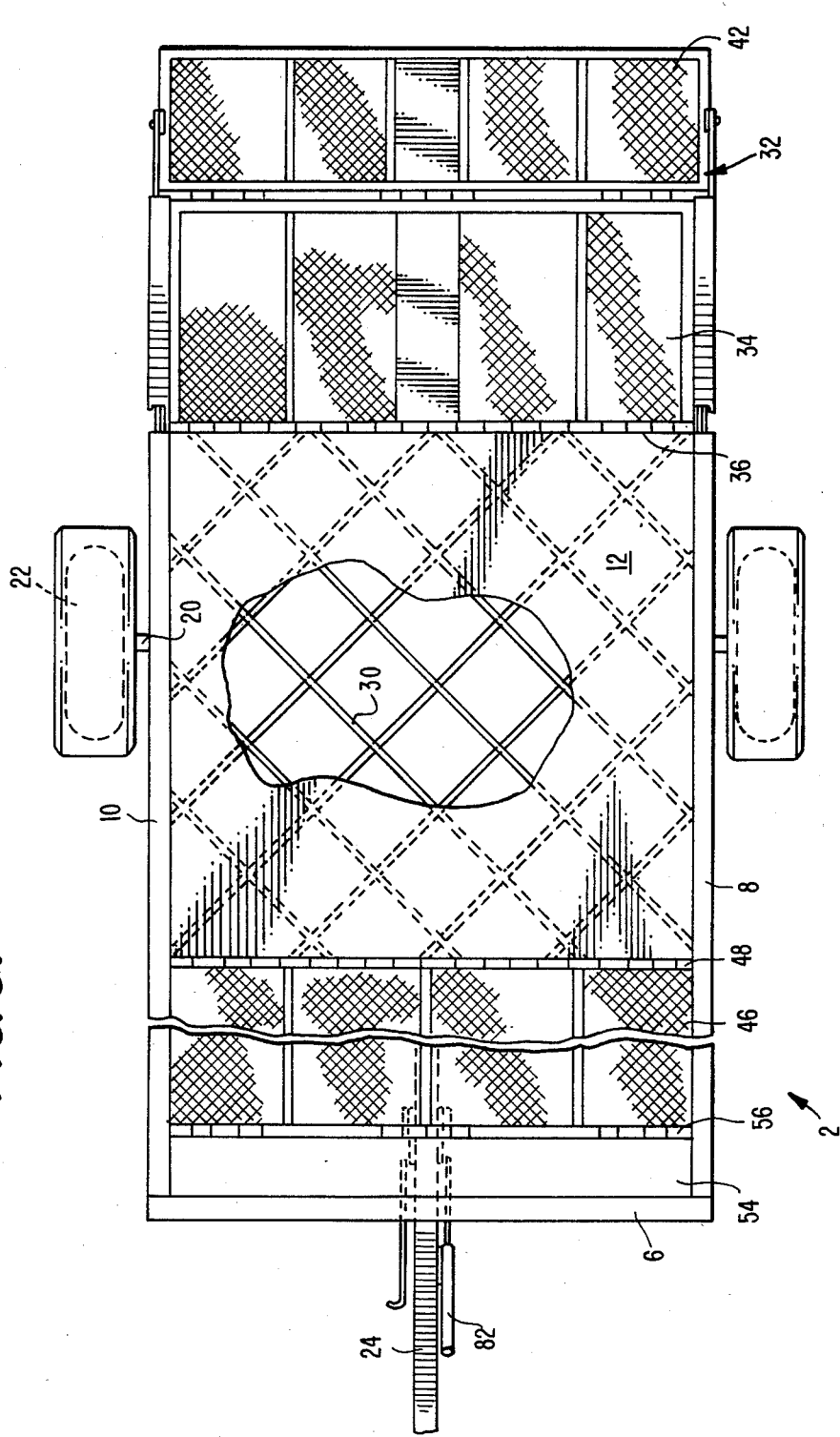
FIG. 5 is a partially cutaway plan view of the utility trailer of FIG. 1.

The utility trailer 2 includes a novel hinged ramp and tailgate assembly indicated generally at 32 which is mounted at the end of the trailer body 4 opposite the front wall 6. This hinged ramp and tailgate assembly includes a first ramp section 34 pivotally secured by means of hinges or other pivotal mounting means 36 to the edge 16 of the trailer bed 12. This first ramp section is provided with spaced understanding sidewalls 38 and 40 which extend along opposite sides thereof and which lie adjacent to the inner surfaces of the trailer body sidewalls 8 and 10, respectively. A second ramp section 42 is pivotally secured by means of a hinge or other pivotal mounting means 44 to the outermost edge of the first ramp section 34. The hinge 44 is constructed in such a manner as to allow the second ramp section 42 to pivot upwardly against the ends of the first ramp section sidewalls 38 and 40, or to pivot downwardly into the plane of the first ramp section 34. These two pivotal positions are illustrated in FIGS. 1 and 2.

The hinged ramp and tailgate assembly 32 is operated by a front ramp assembly 46. This front ramp assembly includes a trigger plate 46 which is pivotally connected to the front edge 14 of the trailer bed 12 by means of a hinge or similar pivotal connector 48. This connector permits the trigger plate to either lie in the plane of the trailer bed 12 as indicated in FIG. 1, or to pivot upwardly away from the trailer bed as indicated in FIG. 2.

Secured to the trigger plate 46 along each side thereof is an upstanding side plate 50 and 52. The side plates 50 and 52 are preferably in the form of a right triangle with the right angle being secured adjacent the hinge 48 and the hypotenuse forming the upper edge of the side plate. Each of the side plates 50 and 52 lie inside and adjacent to the sidewalls 8 and 10, respectively, of the trailer body and the upper edge of the side plates lie substantially parallel to, but below the upper edges of the sidewalls 8 and 10 when the hinged ramp and tailgate assembly is dropped as illustrated in FIG. 2.

The front ramp assembly is completed by a closure plate 54 having one edge which is connected by a hinge 56 to the front edge of the trigger plate 46. The closure plate 54 operates merely to close the space between the front wall 6 of the body 4 and the trigger plate 46. The forward edge of the closure plate is movably retained by the upper surface of the towbar 24 as illustrated in FIG. 3.

With particular reference to FIGS. 3 and 4, it will be noted that the front ramp assembly automatically operates the hinged ramp and tailgate assembly 32 by means of a mechanical linkage. The mechanical linkage which extends along either side of the utility trailer 2 adjacent the inner surface of the sidewalls 8 and 10 is identical, so, for purposes of illustration, only the linkage adjacent the sidewall 8 will be described herein and the same reference numerals will be applied to the linkage adjacent the sidewall 10. This mechanical linkage includes a main pull rod 58 having a forward end which is pivotally connected at 60 to the apex of a triangular side plate 50 or 52. The opposite end of the main pull rod is pivotally connected at 62 to the innermost upper corner of one of the first ramp section sidewalls 38 or 40. The length of the main pull rods 58 is such that the first ramp section 34, the trailer bed 12, and the trigger plate 46 are all permitted to lie in a common plane as illustrated in FIGS. 1 and 4.

As illustrated in FIGS. 2 and 3, the hinge 36 permits the first ramp section 34 to pivot angularly downward from the plane of the trailer bed 12. When this occurs, it is desirable to have the second ramp section 42 pivot downwardly about the hinge 44 into the plane of the first ramp section 34 to form a unitary inclined ramp. The pivotal motion of the second ramp section about the hinge 44 is controlled by identical side linkages which extend from the body sidewalls 8 and 10 to the hinged ramp and tailgate assembly 32. The side linkage adjacent the sidewall 8 will be described for purposes of illustration, and identical reference numerals will be applied to the linkage adjacent the wall 10.

Again, with reference particularly to FIGS. 3 and 4, the linkage for operating the hinged ramp and tailgate assembly 32 includes a first, long link 64 having one end mounted for pivotal movement at 66 to the sidewall 8 for the trailer body 4. The opposite end of the long link 64 is pivoted at 68 to one end of a second, intermediate length link 70. It will also be noted that the intermediate length link 70 is pivotally secured at a point 72 to the lower outermost corner of the first ramp section sidewall 38.

The remaining end of the intermediate length link 70 is pivoted at 74 to one end of a short link 76, while the remaining end of the short link is pivoted at 78 to the second ramp section 42. It will be noted that the pivot point 72 is closer to the pivot point 68 than it is to the pivot point 74.

FIGS. 2 and 3 illustrate that when the hinged ramp and tailgate assembly 32 is inclined downwardly from the trailer bed 12 to receive a vehicle or similar load, the main pull rods 58 draw the side plates 50 and 52 toward the rear of the trailer causing the trigger plate 46 to pivot upwardly about the hinge 48. This also causes the closure plate 54 to be inclined downwardly and angularly outward from the hinge 56. With the hinged ramp and tailgate assembly in this attitude, a vehicle, such as that indicated at V, may be driven up onto the trailer bed 12. When the front wheels of the vehicle contact the trigger plate 46, the trigger plate will be driven downwardly about the hinge 48. As the trigger plate moves downwardly, the main pull rods 58 pull forwardly on the pivot points 62, causing the first ramp section 34 to pivot upwardly about the hinge 36. As this occurs, the long links 64 in FIG. 3 tend to pivot toward the rear of the trailer around the pivot points 66 causing pivotal movement of the intermediate links 70 about the pivot points 72. This causes the intermediate link 70 to move the pivot point 74 both upwardly and forwardly toward the end of the body sidewalls 8 and 10 until the second ramp section 42 is moved against the ends of the trailer sidewalls as illustrated in FIGS. 1 and 4. In this position, the second ramp section is substantially perpendicular to the first ramp section, and operates to form a closed trailer tailgate. This tailgate may be automatically locked in position by an conventional locking means, not shown, which is mounted at the rear of the trailer so as to extend between the body sidewalls 8 and 10 and the second ramp section 42 when the second ramp section swings up to engage the sidewalls. On the other hand, a suitable locking mechanism 80 may be provided at the front of the trailer, as illustrated in FIGS. 2, 3 and 4.

The locking mechanism 80 includes an operating handle 82 which is pivoted at 84 to the towbar 24. The lower end of the pivoted operating handle is pivotally connected to the outermost end of a spring-loaded dog drive rod 86. This dog drive rod is spring-loaded toward the rear of the trailer by a compression spring 88, and the rear end of the dog drive rod is pivotally connected to a locking dog 90 which is in turn pivotally mounted at 92 upon a portion of the towbar 24 which extends beneath the trailer body 4. The locking dog 90 cooperates with a horizontally extending pin 94 secured to the lower extremity of a downwardly projecting ear 96 secured to the underside of the trigger plate 46 adjacent to the hinge 56. When the trigger plate moves downwardly from the position of FIG. 3 to that of FIG. 4, the pin 94 will engage the locking dog 90 and pivot the locking dog toward the front of the trailer body about the pivot 92 against the compression of the spring 98 until the pin moves below the locking dog. At this point, the spring 88 will cause the locking dog to snap back over the pin 94, as illustrated in FIG. 4, to lock the trigger plate in the plane of the trailer bed 12 and to thereby lock the second ramp section 42 in the uppermost tailgate position, as indicated in FIG. 4.

To remove a load from the utility trailer 2, the handle 82 is pivoted back toward the front wall 14 about the pivot 84, thus drawing the dog drive rod forwardly in FIG. 4 against the bias of the spring 88. This causes the locking dog 90 to pivot forwardly about the pivot 92 and to release the pin 94. Now the vehicle V can be moved rearwardly until the rear wheels of the vehicle engage the first ramp section 34 and drive this first ramp section downwardly about the hinge 36. As this occurs, the long links 64 pivot forwardly about the pivot 66 causing the intermediate length link 70 to pivot downwardly and outwardly about the pivot 72. This drives the short link 76 to in turn drive the second ramp section 42 about the hinge 44.

The operating linkage for the utility trailer 2 of the present invention may take a number of forms, and FIGS. 6 and 7 disclose an embodiment of the invention wherein the linkage is mounted to operate externally of the sidewalls 8 and 10 for the trailer body 4. In this embodiment, the trailer bed 12 extends back to the rear extremity of the sidewalls 8 and 10, and the hinge 36 for the first ramp section 34 is positioned at the end of the trailer bed. The first ramp section 34 is provided with two spaed sidewalls which extend upwardly from either side thereof and which are configured to form an expansion for the sidewalls 8 and 10. One of these sidewalls mounted on the first ramp section is illustrated at 98 in FIGS. 6 and 7.

The linkage for operating the hinged ramp and tailgate assembly 32 of FIGS. 6 and 7 differs somewhat from that previously described; a primary difference being the linkage extends on the outside of the sidewalls 8 and 10. It should be recognized that the linkage on each side of the trailer is identical, and consequently only that adjacent to the sidewall 8 is described herein.

With reference to FIG. 6, it will be noted that the trigger plate 46 is secured to a pivot rod 100 which extends between and through the sidewalls 8 and 10 and constitutes part of the hinge structure 48. As the trigger plate 46 moves, the pivot rod 100 rotates. Secured to the pivot rod 100 for movement therewith and positioned outside of the sidewall 8 for the trailer body is a link 102 having an upper end which is pivotally connected at 104 to one end of a main pull rod 106. The opposite end of the main pull rod is pivotally connected at 108 to a link 110, the upper end of which is pivotally connected at 112 to the sidewall 8. The pivotal connection 108 is spaced below the pivotal connection 112, and directly below the pivotal connection 108 is a second pivotal connection 114 between the link 110 and one end of a link 116. The opposite end of the link 116 is pivotally connected at 118 to the sidewall 98 for the first ramp section 34.

The lower end of the link 110 is pivotally connected at 120 to an elongated drive rod 122 which operates the linkage for the second ramp section 42. This linkage includes a first link 124 having a lower end pivotally connected at 126 to the sidewall 98 and an upper end which is pivotally connected at 128 to one end of a link 130. The opposite end of the link 130 is pivotally connected at 132 to the central portion of the second ramp section 42. To drive the second ramp section, the remaining end of the drive rod 122 is pivotally connected to the link 124 at a point 134 between the pivot points 126 and 128.

When the front wheels of a vehicle hit the trigger plate 46, the trigger plate moves downwardly in Figure 6 rotating the rod 100 in a counterclockwise direction to drive the link 102 and the pivot point 104 toward the front wall 6 of the trailer body. This causes the pull rod 106 to rotate the link 110 in a clockwise direction about the pivot point 112, thereby causing the link 116 to pull on the sidewall 98 and rotate the first ramp section 34 upwardly about the hinge 36. At the same time, the pivot point 120 moves toward the front of the trailer with the clockwise movement of the link 110, thereby causing the rod 122 to pull the link 124 in a counterclockwise direction about the pivot point 126. This causes the link 130 to pull the second ramp section 42 into the tailgate position as illustrated in FIG. 7.

To reverse this procedure, when the lock 80 is unlocked and the rear wheels of a vehicle contact the first ramp section 34, the main pull rod 106 moves toward the rear of the trailer under the influence of the links 116 and 110 as the rear ramp section pivots downwardly about the hinge 36. This causes the link 102 to pivot the rod 100 in a clockwise direction raising the trigger plate 46. At the same time, as the link 110 is pulled rearwardly in a counterclockwise direction about the pivot 112 by the link 116, the drive rod 122 forces the link 124 rearwardly in a counterclockwise direction about the pivot point 126. This results in a rearward driving force by the link 130 against the second ramp section 42 which now pivots downwardly into a plane with the first ramp section 34 as illustrated in FIG. 6.

Although the mechanical linkages illustrated herein are preferred, it is obvious that these linkages could be replaced by more expensive drive systems which would raise and lower the hinged ramp and tailgate assembly 32. For example, the main pull rod 106 in FIGS. 6 and 7 could be replaced by the expandable and retractable piston of a hydraulic or pneumatic cylinder with the end of the piston being pivotally connected at 108 to the link 110. The link 102 could operate a hydraulic or pneumatic switching valve to cause the piston to expand when the link is rotated in a clockwise direction and to retract when the link is rotated in a counterclockwise direction to alternately lower and raise the hinged ramp and tailgate assembly. To accomplish this, the trigger plate 46 would have to be spring biased upwardly to the position of FIG. 6, and would be locked in the position of FIG. 7 by the lock 80.

INDUSTRIAL APPLICABILITY

The utility trailer and automatic ramp assembly of the present invention may be towed behind an automobile for transporting such items as lawn and garden equipment, golf carts, and even snowmobiles. The trailer may be used in the construction and agricultural industries for transporting earth moving equipment or other equipment. The trailer and automatic ramp assembly of the present invention is uncomplicated, and when a mechanical linkage is used, it requires no external power such as hydraulic, pneumatic or electrical power for operation. The automatic ramp assembly facilitates the automatic, efficient, safe loading of items on the trailer without requiring the operator to manually adjust or reposition the trailer tailgate assembly.

I claim:

1. A utility trailer, comprising a trailer body having a trailer bed and spaced sidewalls extending along opposite sides of said trailer bed and upwardly beyond the plane of said trailer bed to define an open end at one end of said trailer body, trigger means pivotally connected to said trailer bed for pivotal movement between a first and a second position relative to said trailer bed, said trigger means including load receiving surface means extending outwardly from said trailer bed between said spaced sidewalls and substantially in the plane of said trailer bed when said trigger is in said first position, a ramp means pivotally connected to said trailer bed in spaced relation to said trigger means for pivotal movement between a third and a fourth position relative to said trailer bed, said ramp means extending upwardly relative to the trailer bed and substantially perpendicular thereto across the open end of said body between said sidewalls to close said open end when said ramp means is in the third position and being inclined downwardly from the pivotal connection with said trailer bed when said ramp means is in the fourth position, and drive means mounted on said trailer body, said drive means being connected to said ramp means and also connected for operation by said trigger means, said drive means operating to move said ramp means from said fourth to said third position in response to movement of said trigger means from said second to said first position.

2. The utility trailer of claim 1, wherein said trigger means is mounted for pivotal movement in a first direction relative to said trailer bed when said trigger means moves from said first to said second position and said ramp means is mounted for pivotal movement in a second direction when said ramp means moves from said third to said fourth position, said second direction being opposite to said first direction.

3. The utility tractor of claim 2, wherein said ramp means and said trigger means are connected to opposite ends of said trailer bed.

4. The utility tractor of claim 3, wherein said trigger means is inclined upwardly from the pivotal connection with said trailer bed when said trigger means is in said second position and said ramp means is inclined downwardly from the pivotal connection with said trailer bed when said ramp means is in the fourth position.

5. The utility trailer of claim 4, wherein said drive means includes a mechanical linkage means connected between said trigger means and said ramp means, said mechanical linkage means operating to drive said trigger means from said first to said second position when said ramp means moves from said third to said fourth position and to drive said ramp means from said fourth to said third position when said trigger means moves from said second to said first position.

6. The utility trailer of claim 5, wherein locking means are mounted on said trailer body, said locking means being operable to automatically lock said trigger means and ramp means in position when said trigger means moves to said position and said ramp means moves to said third position.

7. The utility trailer of claim 1, wherein said trigger means is formed to provide a load receiving extension of said trailer bed at the end thereof opposite to the open end of said trailer body when said trigger means is in said first position, said load receiving surface means of said trigger means being inclined upwardly from the pivotal connection thereof with said trailer bed when said trigger means is in said second position.

8. The utility trailer of claim 7, wherein said trailer body includes a front wall extending transversely between said sidewalls at the end thereof opposite to said open end, said trailer bed terminating in spaced relationship to said front wall, and said load receiving surface means of said trigger means extending between said front wall and said trailer bed.

9. The utility trailer of claim 8, wherein said ramp means includes a first ramp section pivotally connected to said trailer bed and a second ramp section pivotally connected to said first ramp section at a point spaced from the pivotal connection between said first ramp section and said trailer bed, said first ramp section having a first ramp load receiving surface means and said second ramp section having a second ramp load receiving surface means, said drive means operating when said trigger means is moved to said first position to move the ramp means to the third position with said first ramp load receiving surface means extending substantially in the plane of said trailer bed and said second ramp load receiving surface means extending substantially perpendicular to said first ramp load receiving surface means and when said ramp means is moved to said fourth position to move said first and second ramp load receiving surface means into substantially the same plane.

10. The utility trailer of claim 9, wherein said spaced sidewalls extending along opposite sides of said trailer bed extend outwardly beyond said trailer bed to a point adjacent to the pivotal connection between said first and second ramp sections.

11. The utility trailer of claim 10, wherein said spaced sidewalls extending along opposite sides of said trailer bed terminate at a point adjacent to the pivotal connection between said trailer bed and said first ramp section, said first ramp section including spaced ramp sidewalls extending along opposite sides of said first ramp load receiving surface means, said ramp sidewalls being substantially coextensive with said spaced sidewalls when said ramp means is in the third position.

12. The utility trailer of claim 9, wherein said drive means includes first mechanical linkage means extending above said trailer bed and between said sidewalls from said trigger means to said first ramp section and second mechanical linkage means connected between said first and second ramp sections.

13. The utility trailer of claim 12, wherein said trigger means is mounted for pivotal movement in a first direction relative to said trailer bed when said trigger means moves from said first to said second position and said ramp means is mounted for pivotal movement in a second direction when said ramp means moves from said third to said fourth position, said second direction being opposite to said first direction.

14. The utility trailer of claim 13, wherein locking means are mounted on said trailer body, said locking means being operable to automatically lock said trigger means and ramp means in position when said trigger means moves to said first position and said ramp means moves to said third position.

15. A utility trailer comprising a trailer bed having a trailer bed, trigger means mounted on said trailer body adjacent to a first end of said trailer bed for movement between a first and a second position relative to said trailer bed, said trigger means including load receiving surface means extending substantially in the plane of said trailer bed when said trigger means is in said first position and moving to a position away from the plane of said trailer bed when said trigger means is in said second position, a ramp means mounted upon said trailer body for pivotal movement relative to said trailer bed between a third and a fourth position, at least a portion of said ramp means extending substantially perpendicular to said trailer bed when said ramp means is in the third position and said ramp means being inclined outwardly from said trailer bed when said ramp means is in the fourth position, and drive means connected between said trigger means and said ramp means, said drive means operating to move said ramp means from said fourth to said third position when said trigger means is moved from said second to said first position and to move said trigger means from said first to said second position when said ramp means is moved from said third to said fourth position.

16. The utility trailer of claim 15, wherein said ramp means is mounted on said trailer body adjacent to a second end of said trailer body, said second end being opposite to and spaced from said first end.

17. The utility trailer of claim 16, wherein said drive means includes mechanical linkage means extending between said trigger means and said ramp means along opposite sides of said said trailer body.

18. The utility trailer of claim 16, wherein said ramp means includes a first ramp section pivotally mounted on said trailer body and a second ramp section pivotally connected to said first ramp section, said drive means including linkage means connected between said first and second ramp sections, said drive means operating when said trigger means is moved to said first position to move said ramp means to the third position with said first ramp section extending substantially in the plane of said trailer bed and said second ramp section extending substantially perpendicular to said first ramp section.

19. The utility trailer of claim 16, wherein locking means are mounted on said trailer body, said locking means being operable to automatically lock said trigger means and ramp means in position when said trigger means moves to said first position and said ramp means moves to said third position.

20. The utility trailer of claim 19, wherein said trigger means is pivotally secured to the first end of said trailer bed and said ramp means is pivotally secured to the second end of said trailer bed, the load receiving surface means for said trigger means being inclined away from said trailer bed in a first direction when said trigger means is in the second position and said ramp means being inclined away from said trailer bed in a second direction opposite to said first direction when said ramp means is in the fourth position.

21. The utility trailer of claim 20, wherein said ramp means includes a first ramp section pivotally secured to said trailer bed and a second ramp section pivotally connected to said first ramp section, said drive means including first mechanical linkage means extending between said trigger means and said ramp means along opposite sides of said trailer body and second linkage means connected between said first and second ramp sections, said drive means operating when said trigger means is moved to said first position to move the ramp means to the third position with said first ramp section extending in substantially the plane of said trailer bed and said second ramp section extending substantially perpendicular to said first ramp section, and when said ramp means moves to said fourth position to move said second ramp section and first ramp section into substantially the same plane.

* * * * *